US012630712B2

(12) United States Patent
Teng et al.

(10) Patent No.: US 12,630,712 B2
(45) Date of Patent: May 19, 2026

(54) THERMOPLASTIC COMPOSITIONS INCLUDING BLENDS OF POLYETHER ETHER KETONE AND POLYETHERIMIDE

(71) Applicant: SHPP GLOBAL TECHNOLOGIES B.V., Bergen op Zoom (NL)

(72) Inventors: Weibing Teng, Selkirk, NY (US); Hao Zhou, Mt. Vernon, IN (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 18/855,439

(22) PCT Filed: Apr. 11, 2023

(86) PCT No.: PCT/IB2023/053686
§ 371 (c)(1),
(2) Date: Oct. 9, 2024

(87) PCT Pub. No.: WO2023/203436
PCT Pub. Date: Oct. 26, 2023

(65) Prior Publication Data
US 2025/0115759 A1      Apr. 10, 2025

(30) Foreign Application Priority Data

Apr. 20, 2022      (EP) .................................... 22169023

(51) Int. Cl.
*C08L 71/00*      (2006.01)
*C08K 7/14*      (2006.01)
(52) U.S. Cl.
CPC ................ *C08L 71/00* (2013.01); *C08K 7/14* (2013.01); *C08K 2201/004* (2013.01); *C08L 2203/30* (2013.01)

(58) Field of Classification Search
CPC ....... C08L 71/00; C08L 2203/30; C08K 7/14; C08K 2201/004
See application file for complete search history.

(56) References Cited

U.S. PATENT DOCUMENTS 5,580,918 A      12/1996   Morita et al.
7,033,675 B2      4/2006   Taniguchi et al.
(Continued)

FOREIGN PATENT DOCUMENTS

CN          1064059 C      4/2001
CN       101759991 B      2/2013
(Continued)

OTHER PUBLICATIONS

Murphy, John. "Additives for Plastics Handbook", 2nd edition, Chapter 5, 2001. (Year: 2001).*
(Continued)

*Primary Examiner* — Catherine S Branch
*Assistant Examiner* — Andrea Wu
(74) *Attorney, Agent, or Firm* — Quicker Law, LLC

(57)          ABSTRACT

Thermoplastic compositions include: from about 50 wt % to about 70 wt % of a PEEK (polyether ether ketone) component; from about 5 wt % to about 20 wt % of a PEI (polyetherimide) component; and from about 20 wt % to about 40 wt % of a glass fiber component. The combined weight percent value of all components does not exceed 100 wt %, and all weight percent values are based on the total weight of the composition. Methods for forming a molded article including the thermoplastic composition are described.

14 Claims, 1 Drawing Sheet

(56) References Cited

U.S. PATENT DOCUMENTS

| | | |
|---|---|---|
| 9,296,175 B2 | 3/2016 | Yamaguchi et al. |
| 9,765,176 B2 | 9/2017 | Taylor et al. |
| 10,023,691 B2 | 7/2018 | Capra et al. |
| 10,364,352 B2 | 7/2019 | Hsu et al. |
| 10,759,923 B2 | 9/2020 | Agarwal et al. |
| 2015/0087767 A1 | 3/2015 | Moniruzzaman et al. |
| 2020/0032010 A1 | 1/2020 | Liao et al. |

FOREIGN PATENT DOCUMENTS

| | | | |
|---|---|---|---|
| CN | 103146134 | A | 6/2013 |
| CN | 108250668 | A | 7/2018 |
| CN | 109517332 | A | 3/2019 |
| DE | 10-2017-212255 | A1 | 1/2019 |
| EP | 0163464 | A1 | 12/1985 |
| EP | 2366728 | B1 | 9/2011 |
| GB | 2542508 | A8 | 4/2017 |
| GB | 2543362 | A | 4/2017 |
| JP | 4873903 | B2 | 2/2012 |
| JP | 2020-001344 | A | 1/2020 |
| JP | 6715765 | B2 | 7/2020 |
| JP | 2020-535237 | A | 12/2020 |
| JP | 2021-020972 | A | 2/2021 |
| KR | 10-2016-0083518 | A | 7/2016 |
| TW | I642692 | B | 12/2018 |
| WO | 2007/035402 | A2 | 3/2007 |
| WO | 2021/089747 | A1 | 5/2021 |

OTHER PUBLICATIONS

International Search Report and Written Opinion mailed Jul. 21, 2023 in PCT/IB2023/053686 (10 pgs.).

International Preliminary Report on Patentability mailed Apr. 24, 2024 in PCT/IB2023/053686 (13 pgs.).

* cited by examiner

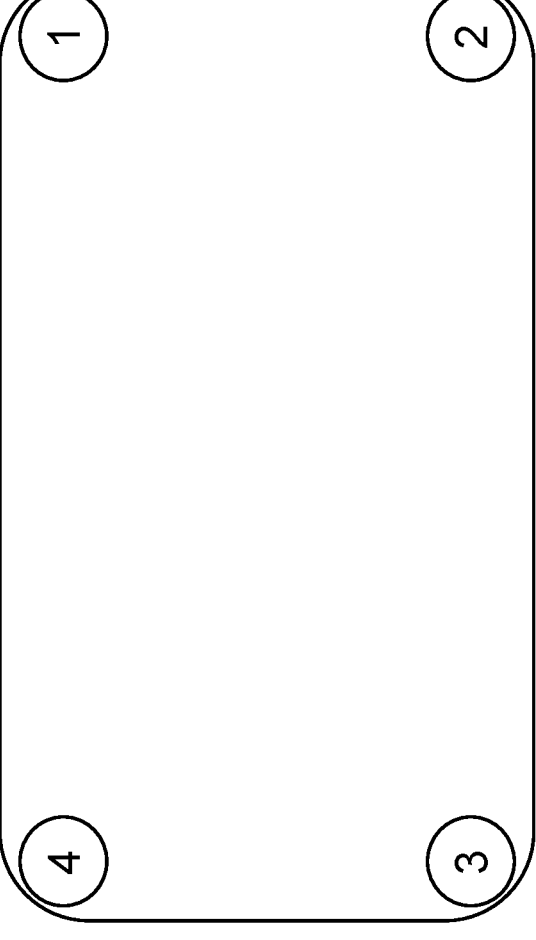

THERMOPLASTIC COMPOSITIONS INCLUDING BLENDS OF POLYETHER ETHER KETONE AND POLYETHERIMIDE

CROSS-REFERENCE TO RELATED APPLICATION

This application is the National Stage of International Application No. PCT/IB2023/053686 filed Apr. 11, 2023, which claims priority to and the benefit of European Application No. 22169023.3 filed Apr. 20, 2022, the disclosures of which are incorporated herein by this reference in their entireties.

FIELD OF THE DISCLOSURE

The present disclosure relates to glass-filled thermoplastic compositions including a blend of polyether ether ketone (PEEK) and polyetherimide (PEI) that have good dimensional stability and mechanical properties.

BACKGROUND OF THE DISCLOSURE

Polyether ether ketone (PEEK) is a high temperature semi-crystalline polymer that exhibits very high part shrinkage upon cooling from a mold. PEEK can be blended with high aspect ratio fillers such as glass fiber; this significantly reduces shrinkage in the flow direction, however molded articles still shrink to a much larger degree in the cross-flow (x-flow) direction than in the flow direction. This differential shrinkage causes the molded part to warp due to non-uniform shrinkage in different directions. To address this warpage problem, a post-molding operation (secondary operation) could be applied to the article to improve its flatness. If this is unsuccessful the article would need to be discarded, lowering yield and productivity and increasing production cost.

These and other shortcomings are addressed by aspects of the present disclosure.

International Publication WO2021/089747 describes compositions of polyarylether ketone copolymers and polyetherimides having improved thermal resistance and mechanical properties, a method of making the same, and to the use thereof in various fields, including as thermoplastic matrices for continuous fiber composites.

U.S. Patent Publication US2015/0087767 describes methods and fiber reinforced thermoplastic composition including a polyaryletherketone (PAEK) component, a polyimide component, and a fiber reinforcement component. The polyimide component includes a blend of at least a first polyimide (PI) having a glass transition temperature of at least 300° C. and a second polyimide (PI) having a glass transition temperature less than the glass transition temperature of the first polyimide. The resulting fiber reinforced thermoplastic compositions exhibit improved mechanical performance.

U.S. Pat. No. 5,580,918 describes a polyimide resin composition including 50-95 parts by weight of a polyimide resin and 50-5 parts by weight of a polyetheretherketone, the composition having been subjected to heat treatment at 250-330° C., and, after the heat-treatment, having crystallization enthalpy of 0-6 calories per gram. The heat treatment of the polyimide resin composition can be effected at a low temperature in a short time. The polyimide resin composition has excellent dimensional stability and high-temperature physical properties. Moreover, it has excellent moldability and peeling resistance.

International Publication WO2007/035402 describes phase separated blends of polyaryl ether ketones, polyaryl ketones, polyether ketones, polyether ether ketones and mixtures thereof with at least one polysulfone etherimide. The polysulfone etherimide has greater than or equal to 50 mole % of the polymer linkages contain at least one aryl sulfone group. Such blends have improved load bearing capability at high temperature. In another aspect a high crystallization temperature, especially at fast cooling rates, is achieved.

SUMMARY

The present disclosure describes compositions including blends of PEEK and polyetherimide (PEI). It has been found that compositions including blends of PEEK and PEI have improved dimensional stability and lower part warpage than compositions including only PEEK. Further, they do not have a negative effect on PEEK crystallization behavior or mechanical properties Aspects of the disclosure relate to thermoplastic compositions including: from about 50 wt % to about 70 wt % of a PEEK (polyether ether ketone) component; from about 5 wt % to about 20 wt % of a PEI (polyetherimide) component; and from about 20 wt % to about 40 wt % of a glass fiber component. The combined weight percent value of all components does not exceed 100 wt %, and all weight percent values are based on the total weight of the composition.

Further aspects of the disclosure relate to methods for forming a molded article, including: combining, to form a mixture, (a) from about 50 wt % to about 70 wt % of a PEEK (polyether ether ketone) component, (b) from about 5 wt % to about 20 wt % of a PEI (polyetherimide) component, and (c) from about 20 wt % to about 40 wt % of a glass fiber component; and molding the mixture to form the molded article. The combined weight percent value of all components does not exceed 100 wt %, and all weight percent values are based on the total weight of the article.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

FIG. 1 is an illustration of an exemplary injection molded part showing the 4 corners used to determine and calculate total part warpage.

DETAILED DESCRIPTION

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

DEFINITIONS

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a glass fiber component" includes mixtures of two or more glass fibers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated+10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure relate to a thermoplastic composition including: from about 50 wt % to about 70 wt % of a PEEK (polyether ether ketone) component; from about 5 wt % to about 20 wt % of a PEI (polyetherimide) component; and from about 20 wt % to about 40 wt % of a glass fiber component. The combined weight percent value of all components does not exceed 100 wt %, and all weight percent values are based on the total weight of the composition.

In some aspects the composition includes from about 55 wt % to about 65 wt % of the PEEK component, from about 5 wt % to about 15 wt % of the PEI component, and from about 25 wt % to about 35 wt % of the glass fiber component. In particular aspects the composition includes from about 58 wt % to about 60 wt % of the PEEK component, about 10 wt % of the PEI component, and from about 30 wt % to about 32 wt % of the glass fiber component.

In some aspects the PEEK component includes, but is not limited to, a high flow grade polyether ether ketone. In an aspect of the PEEK component has a melt viscosity of from 120 to 180 Pascal-seconds (Pa·s) at 400° C. as determined in accordance with ISO 11443.

An exemplary PEI includes, but is not limited to, ULTEM™, available from SABIC.

The glass fiber may include, but is not limited to, chopped glass fiber, flat glass fiber, or a combination thereof. In certain aspects the glass fiber component includes glass fibers having a length of about 3 mm (millimeters).

Articles formed from thermoplastic compositions according to aspects of the disclosure have improved shrinkage properties as compared to conventional compositions that do not include the PEI component. In some aspects a rectangular sample of the composition injection molded into a mold having a length of 8 in (inches), a width of 6 in, and a thickness of 3.2 mm (millimeters) exhibits a shrinkage of less than 0.5% in length and less than 0.5% in width at 23° C. In certain aspects the rectangular sample exhibits a shrinkage of less than 0.45% in length and less than 0.45% in width. In further aspects the rectangular sample exhibits a shrinkage of about 0.35% in length and about 0.4% in width.

In specific aspects the rectangular sample exhibits a total warpage of less than 1.0 mm, wherein total warpage is determined by measuring warpage at each of 4 corners of the rectangular sample and adding the warpage at the 4 corners to determine total warpage. In particular aspects the rectangular sample exhibits a total warpage of less than 0.9 mm, or less than 0.8 mm, or less than 0.7 mm, or less than 0.6 mm, or less than 0.5 mm, or less than 0.4 mm, or less than 0.3 mm, or less than 0.2 mm, or less than 0.1 mm, or 0.0 mm warpage, or substantially no warpage.

In some aspects the rectangular sample exhibits at least 50% less total warpage than a comparative sample that does not include the PEI component, wherein total warpage is determined by measuring warpage at each of 4 corners of the rectangular sample and adding the warpage at the 4 corners to determine total warpage. In further aspects the rectangular sample exhibits at least 55% less warpage, or at least 60% less warpage, or at least 65% less warpage, or at least 70% less warpage, or at least 75% less warpage, or at least 80% less warpage, or at least 85% less warpage, or at least 90% less warpage, or at least 95% less warpage, or at least 99% less warpage, than the comparative sample that does not include the PEI component. As described herein, a comparative sample that does not include the PEI component includes all of the components of the example composition and in the same amounts of the example composition, except that the PEI component is replace by an equivalent amount of the other polymer resin in the composition (e.g., the PEEK component).

Methods of Manufacture

The one or any foregoing components described herein may be first dry blended with each other, or dry blended with any combination of foregoing components, then fed into an extruder from one or multi-feeders, or separately fed into an extruder from one or multi-feeders. The fillers used in the disclosure may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

In some aspects methods for forming a molded article include: combining, to form a mixture, (a) from about 50 wt % to about 70 wt % of a PEEK (polyether ether ketone)

component, (b) from about 5 wt % to about 20 wt % of a PEI (polyetherimide) component, and (c) from about 20 wt % to about 40 wt % of a glass fiber component; and molding the mixture to form the molded article. The combined weight percent value of all components does not exceed 100 wt %, and all weight percent values are based on the total weight of the article.

In specific aspects the molding includes injection molding, extrusion, rotational molding, blow molding, thermoforming, or a combination thereof.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In specific aspects the article is a compressor plate, a housing for a telecommunications device, a bracket for an automotive sensor, or any article requiring polymer-based materials with good dimensional stability and mechanical properties.

In a further aspect, the article is extrusion molded. In a still further aspect, the article is injection molded.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of, or consisting essentially of:

from about 50 wt % to about 70 wt % of a PEEK (polyether ether ketone) component;

from about 5 wt % to about 20 wt % of a PEI (polyetherimide) component; and from about 20 wt % to about 40 wt % of a glass fiber component, wherein the combined weight percent value of all components does not exceed 100 wt %, and all weight percent values are based on the total weight of the composition.

Aspect 2. The thermoplastic composition according to Aspect 1, wherein the composition comprises from about 55 wt % to about 65 wt % of the PEEK component, from about 5 wt % to about 15 wt % of the PEI component, and from about 25 wt % to about 35 wt % of the glass fiber component.

Aspect 3. The thermoplastic composition according to Aspect 1 or 2, wherein the composition comprises from about 58 wt % to about 60 wt % of the PEEK component, about 10 wt % of the PEI component, and from about 30 wt % to about 32 wt % of the glass fiber component.

Aspect 4. The thermoplastic composition according to any of Aspects 1 to 3, wherein the glass fiber component comprises chopped glass fiber, flat glass fiber, or a combination thereof.

Aspect 5. The thermoplastic composition according to Aspect 4, wherein the glass fiber component comprises glass fibers having a length of about 3 mm (millimeters).

Aspect 6. The thermoplastic composition according to any of Aspects 1 to 5, wherein the PEEK component has a melt viscosity of from 120 to 180 Pascal-seconds (Pa·s) at 400° C. as determined in accordance with ISO 11443.

Aspect 7. The thermoplastic composition according to any of Aspects 1 to 6, wherein a rectangular sample of the composition injection molded into a mold having a length of 8 in (inches), a width of 6 in, and a thickness of 3.2 mm (millimeters) exhibits a shrinkage of less than 0.5% in length and less than 0.5% in width at 23° C.

Aspect 8. The thermoplastic composition according to Aspect 7, wherein the rectangular sample exhibits a shrinkage of less than 0.45% in length and less than 0.45% in width.

Aspect 9. The thermoplastic composition according to Aspect 7, wherein the rectangular sample exhibits a shrinkage of about 0.35% in length and about 0.4% in width.

Aspect 10. The thermoplastic composition according to any of Aspects 7 to 9, wherein the rectangular sample exhibits a total warpage of less than 1.0 mm, wherein total warpage is determined by measuring warpage at each of 4 corners of the rectangular sample and adding the warpage at the 4 corners to determine total warpage.

Aspect 11. The thermoplastic composition according to any of Aspects 7 to 10, wherein the rectangular sample exhibits at least 50% less total warpage than a comparative sample that does not include the PEI component, wherein total warpage is determined by measuring warpage at each of 4 corners of the rectangular sample and adding the warpage at the 4 corners to determine total warpage.

Aspect 12. A method for forming a molded article, comprising, consisting of, or consisting essentially of:

combining, to form a mixture, (a) from about 50 wt % to about 70 wt % of a PEEK (polyether ether ketone) component, (b) from about 5 wt % to about 20 wt % of a PEI (polyetherimide) component, and (c) from about 20 wt % to about 40 wt % of a glass fiber component; and molding the mixture to form the molded article, wherein the combined weight percent value of all components does not exceed 100 wt %, and all weight percent values are based on the total weight of the article.

Aspect 13. The method according to Aspect 12, wherein the molding comprises injection molding, extrusion, rotational molding, blow molding, thermoforming, or a combination thereof.

Aspect 14. The method according to Aspect 12 or 13, wherein the article comprises from about 55 wt % to about 65 wt % of the PEEK component, from about 5 wt % to about 15 wt % of the PEI component, and from about 25 wt % to about 35 wt % of the glass fiber component.

Aspect 15. The method according to any of Aspects 12 to 14, wherein the article comprises from about 58 wt % to about 60 wt % of the PEEK component, about 10 wt % of the PEI component, and from about 30 wt % to about 32 wt % of the glass fiber component.

Aspect 16. The method according to any of Aspects 12 to 15, wherein the glass fiber component comprises chopped glass fiber, flat glass fiber, or a combination thereof.

Aspect 17. The method according to Aspect 16, wherein the glass fiber component comprises glass fibers having a length of about 3 mm (millimeters).

Aspect 18. The method according to any of Aspects 12 to 17, wherein the PEEK component has a melt viscosity of from 120 to 180 Pascal-seconds (Pa·s) at 400° C. as determined in accordance with ISO 11443.

Aspect 19. The method according to any of Aspects 12 to 17, wherein a rectangular sample of the composition injection molded into a mold having a length of 8 in (inches), a width of 6 in, and a thickness of 3.2 mm (millimeters) exhibits a shrinkage of less than 0.5% in length and less than 0.5% in width at 23° C.

Aspect 20. The method according to Aspect 19, wherein the rectangular sample exhibits a shrinkage of less than 0.45% in length and less than 0.45% in width.

Aspect 21. The method according to Aspect 19, wherein the rectangular sample exhibits a shrinkage of about 0.35% in length and about 0.4% in width.

Aspect 22. The method according to any of Aspects 19 to 21, wherein the rectangular sample exhibits a total warpage of less than 1.0 mm, wherein total warpage is determined by measuring warpage at each of 4 corners of the rectangular sample and adding the warpage at the 4 corners to determine total warpage.

Aspect 23. The method according to any of Aspects 19 to 22, wherein the rectangular sample exhibits at least 50% less total warpage than a comparative sample that does not include the PEI component, wherein total warpage is determined by measuring warpage at each of 4 corners of the rectangular sample and adding the warpage at the 4 corners to determine total warpage.

Aspect 24. An article comprising the thermoplastic composition according to any of Aspects 1 to 10, wherein the article is a compressor plate, a housing for a telecommunications device, or a bracket for an automotive sensor.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Compositions were formed and various properties tested as set forth in Table 1:

TABLE 1

| Compositions and Properties | | | | |
|---|---|---|---|---|
| | wt % | C1 | C2 | C3 |
| Composition | | | | |
| PEEK | | 70 | 70 | 60 |
| PEI (Ultem ™) | | | | 10 |
| GF1 | | 30 | | |
| GF2 | | | 30 | 30 |
| Total | | 100 | 100 | 100 |
| Properties | | | | |
| Specific Gravity | | 1.535 | 1.537 | 1.529 |
| HDT (0.45 MPa) | ° C. | 337 | 337 | 330 |
| Tensile Modulus | MPa | 11580 | 11880 | 11280 |
| Tensile Strength | MPa | 188 | 179 | 168 |
| Tensile Elongation at break | % | 2.3 | 2.1 | 1.9 |
| Flex Modulus | MPa | 10200 | 10200 | 9630 |
| Flex Strength | MPa | 266 | 249 | 223 |
| UNII (23° C.) | J/m | 808 | 803 | 784 |
| NII (23° C.) | J/m | 108 | 101 | 109 |
| CTE, flow | µm/m-° C. | 20.65 | 22.35 | 23.90 |
| CTE, x-flow | µm/m-° C. | 33.24 | 36.15 | 32.28 |
| Tc, onset | ° C. | 294.3 | 298.1 | 295.2 |
| Tc, peak | ° C. | 289.8 | 294.3 | 291.0 |
| ΔH | J/g | 34.21 | 30.28 | 30.02 |
| Crystallinity | % | 26.32 | 23.29 | 23.09 |
| Tm, peak | ° C. | 343.4 | 344.5 | 340.4 |
| Tg | ° C. | 147.5 | 151.5 | 161.03 |
| Shear Strength | MPa | 106 | 103 | 102 |
| Compression Strength, flow | MPa | 214 | 215 | 202 |
| Compression Strength, x-flow | MPa | 236 | 225 | 208 |
| Compression Modulus, flow | GPa | 4.5 | 4.3 | 4.4 |
| Compression Modulus, x-flow | GPa | 5.3 | 5.5 | 5.0 |

The following units are abbreviated in Table 1: degrees Celsius (° C.); megapascals (MPa); Joules per meter (J/m); micron per meter ° C. (µm/m-° C.); Joules per gram (J/g); gigapascals (GPa).

Specific gravity was determined in accordance with ASTM D792. Heat distortion temperature (HDT) was determined in accordance with ASTM D648 at 0.45 megapascals (MPa). Tensile properties (modulus, strength, and elongation at break) were determined in accordance with ASTM D638. Flexural properties (modulus and strength) were determined in accordance with ASTM D790. Unnotched Izod impact strength (UNII) was determined in accordance with ASTM D4812 at room temperature (23° C.). Notched Izod impact strength (NII) was determined in accordance with ASTM D256 at room temperature. Coefficient of thermal expansion (CTE) was determined in the flow and cross-flow (x-flow) directions in accordance with ASTM E831. Crystallization properties (crystallization temperature Tc (onset and peak), change in enthalpy (ΔH), crystallinity, melting temperature Tm (peak) and glass transition temperature Tg) were determined by differential scanning calorimetry (DSC) and the SABIC Method. The SABIC Method uses DSC to study the material behavior under heating and cooling cycles. Pelletized samples of the thermoplastic composition are placed in an aluminum pan, and the endothermic and exothermic behavior is recorded with DSC heating from room temperature to 400° C. at a rate of 20° C. per minute (° C./min) and then cooling to room temperature at a rate of 20° C./min. Shear strength was determined in accordance with ASTM D732. Compression properties (strength in flow and x-flow, modulus in flow and x-flow) were determined in accordance with ASTM D695.

Composition C1 is a PEEK-glass fiber (GF1) blend at a 70:30 ratio; composition C2 is a PEEK-glass fiber (GF2) blend at a 70:30 ratio; composition C3 is a PEEK, ULTEM, and glass fiber (GF2) blend at 60:10:30 ratio. GF1 and GF2 are both flat glass fibers available from Nittobo. The PEEK was a conventional high flow grade polyether ether ketone. The PEI was ULTEM™, from SABIC.

From the results in Table 1 it was observed that the three different blends have similar physical, and mechanical properties. Blending the amorphous (PEI) and crystalline (PEEK) polymers results in a change in crystallization behavior, including slowing down the crystallization rate and lowering crystallinity. In some cases, the addition of amorphous polymer would completely disrupt the crystallization formation of the other phase, which can negatively affect chemical resistance and long term creep performance. Looking at the DSC cooling data, we can see that the three blends start to crystallize at a similar temperature (around 295° C.) and peak at about 290° C. In addition, the crystallinity of each composition was comparable (slightly above 23%). From this data it can be concluded that the three compositions have very similar crystallization behavior (rate and the degree of crystallinity). One observable difference is that the composition including PEI had an increased Tg of about 10° C.

Shrinkage and warpage were evaluated by injection molding the composition into an 8 inch long and 6 inch wide mold having a thickness of 3.2 millimeters (mm). Shrinkage of the injection-molded part was evaluated at room temperature (23° C.) by measuring the length and width of the injection molded part and comparing it to the tool dimension (8" (inches or in)×6"). The shrinkage of composition C3 was the lowest in both width and height directions. With reference to Table 2 and FIG. 1, the warpages of the plaques were measured at each corner, and the total warpage is the sum of the four warp numbers. The warpage reduction observed in composition C3 was significant even in a small simple plaque part. The total warpage of composition C3 was only 0.65 mm, about a third of the warpage of composition C1, and about one fifth of the warpage of composition C2.

TABLE 2

| | | Shrinkage and Warpage Properties | | |
| --- | --- | --- | --- |
| | C1 | C2 | C3 |
| Width (in) | 5.970 | 5.970 | 5.976 |
| Height (in) | 7.968 | 7.960 | 7.972 |
| Shrinkage in W (%) | 0.50 | 0.50 | 0.40 |
| Shrinkage in H (%) | 0.40 | 0.50 | 0.35 |
| Warp at ① (mm) | 0.92 | 1.71 | 0.06 |
| Warp at ② (mm) | 0.05 | 0.08 | 0.25 |
| Warp at ③ (mm) | 0.86 | 1.71 | 0.13 |
| Warp at ④ (mm) | 0.08 | 0.07 | 0.21 |
| Total Warp (mm) | 1.91 | 3.57 | 0.65 |

The above description is intended to be illustrative, and not restrictive. For example, the above-described examples (or one or more aspects thereof) may be used in combination with each other. Other aspects can be used, such as by one of ordinary skill in the art upon reviewing the above descrip-tion. The Abstract is provided to comply with 37 C.F.R. § 1.72 (b), to allow the reader to quickly ascertain the nature of the technical disclosure. It is submitted with the under-standing that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim stand-ing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A thermoplastic composition consisting of:
from about 50 wt % to about 70 wt % of a PEEK (polyether ether ketone) homopolymer;
from about 5 wt % to about 20 wt % of a PEI (polyether-imide) homopolymer; and
from about 20 wt % to about 40 wt % glass fiber,
wherein a rectangular sample of the composition injection molded into a mold having a length of 8 in (inches), a width of 6 in, and a thickness of 3.2 mm (millimeters) exhibits a shrinkage of less than 0.5% in length and less than 0.5% in width at 23° C., and
wherein the combined weight percent value of all com-ponents does not exceed 100 wt %, and all weight percent values are based on the total weight of the composition.

2. The thermoplastic composition according to claim 1, wherein the composition consists of from about 55 wt % to about 65 wt % of the PEEK homopolymer, from about 5 wt % to about 15 wt % of the PEI homopolymer, and from about 25 wt % to about 35 wt % of the glass fiber.

3. The thermoplastic composition according to claim 1, wherein the composition consists of from about 58 wt % to about 60 wt % of the PEEK homopolymer, about 10 wt % of the PEI homopolymer, and from about 30 wt % to about 32 wt % of the glass fiber.

4. The thermoplastic composition according claim 1, wherein the glass fiber consists of chopped glass fiber, flat glass fiber, or a combination thereof.

5. The thermoplastic composition according to claim 4, wherein the glass fiber consists of glass fibers having a length of about 3 mm (millimeters).

6. The thermoplastic composition according to claim 1, wherein the PEEK homopolymer has a melt viscosity of from 120 to 180 Pascal-seconds (Pa-s) at 400° C. as deter-mined in accordance with ISO 11443.

7. The thermoplastic composition according to claim 1, wherein the rectangular sample exhibits a shrinkage of less than 0.45% in length and less than 0.45% in width.

8. The thermoplastic composition according to claim 1, wherein the rectangular sample exhibits a shrinkage of about 0.35% in length and about 0.4% in width.

9. The thermoplastic composition according to claim 1, wherein the rectangular sample exhibits a total warpage of less than 1.0 mm, wherein total warpage is determined by measuring warpage at each of 4 corners of the rectangular sample and adding the warpage at the 4 corners to determine total warpage.

10. The thermoplastic composition according to claim 1, wherein the rectangular sample exhibits at least 50% less total warpage than a comparative sample that does not include the PEI homopolymer, wherein total warpage is determined by measuring warpage at each of 4 corners of the rectangular sample and adding the warpage at the 4 corners to determine total warpage.

11. A method for forming a molded article, consisting of:
combining, to form a mixture, (a) from about 50 wt % to about 70 wt % of a PEEK (polyether ether ketone) homopolymer, (b) from about 5 wt % to about 20 wt % of a PEI (polyetherimide) homopolymer, and (c) from about 20 wt % to about 40 wt % glass fiber; and
molding the mixture to form the molded article,
wherein a rectangular molded sample of the mixture that is injection molded into a mold having a length of 8 in (inches), a width of 6 in, and a thickness of 3.2 mm (millimeters) exhibits a shrinkage of less than 0.5% in length and less than 0.5% in width at 23° C., and wherein the combined weight percent value of all components does not exceed 100 wt %, and all weight percent values are based on the total weight of the article.

12. The method according to claim 11, wherein the molding consists of injection molding, extrusion, rotational molding, blow molding, thermoforming, or a combination thereof.

13. The method according to claim 11, wherein the article consists of from about 55 wt % to about 65 wt % of the PEEK homopolymer, from about 5 wt % to about 15 wt % of the PEI homopolymer, and from about 25 wt % to about 35 wt % of the glass fiber.

14. An article consisting of the thermoplastic composition according to claim 1, wherein the article is a compressor plate, a housing for a telecommunications device, or a bracket for an automotive sensor.

* * * * *